United States Patent
Giorgetta et al.

(10) Patent No.: US 7,633,878 B2
(45) Date of Patent: Dec. 15, 2009

(54) SELECTABLE LOSS OF SIGNAL (LOS) CRITERIA

(75) Inventors: Timothy Eric Giorgetta, San Diego, CA (US); Madjid A. Hamidi, San Diego, CA (US); Simon Sai-Man Pang, La Mesa, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 554 days.

(21) Appl. No.: 11/516,899

(22) Filed: Sep. 7, 2006

(65) Prior Publication Data

US 2008/0062884 A1 Mar. 13, 2008

(51) Int. Cl.
*H04J 1/16* (2006.01)

(52) U.S. Cl. ...................... 370/244; 370/252

(58) Field of Classification Search ................ 370/244, 370/252, 253, 241, 216
See application file for complete search history.

(56) References Cited

U.S. PATENT DOCUMENTS 6,999,480 B2   2/2006  Subrahamanyan .......... 370/516
2003/0031212 A1*  2/2003  Becker et al. ................ 370/537
2004/0208568 A1* 10/2004  Sweeney et al. .............. 398/79
2005/0243958 A1* 11/2005  Fernald ....................... 375/360

* cited by examiner

*Primary Examiner*—Brian D Nguyen
(74) *Attorney, Agent, or Firm*—Law Office of Gerald Maliszewski; Gerald Maliszewski

(57) ABSTRACT

A system and method are provided for selecting loss of signal (LOS) criteria in a serial communications receiver. The method receives a serial stream of digital data and selects LOS criteria. The serial stream of digital data is compared to the selected LOS criteria. In response to the serial stream of digital data failing to meet the selected LOS criteria, a LOS signal is generated. Some examples of the LOS criteria that might be selected include: a "signal detect" signal received from the source transmitting the serial stream of digital data, a run length test, a signal strength (voltage amplitude) test, harmonic band detection test, and a received data clock test. In one aspect, selecting LOS criteria includes selecting combinations of the above-mentioned LOS criteria, so that the LOS signal is generated in response to failing to meet the combination of selected LOS criteria.

16 Claims, 5 Drawing Sheets

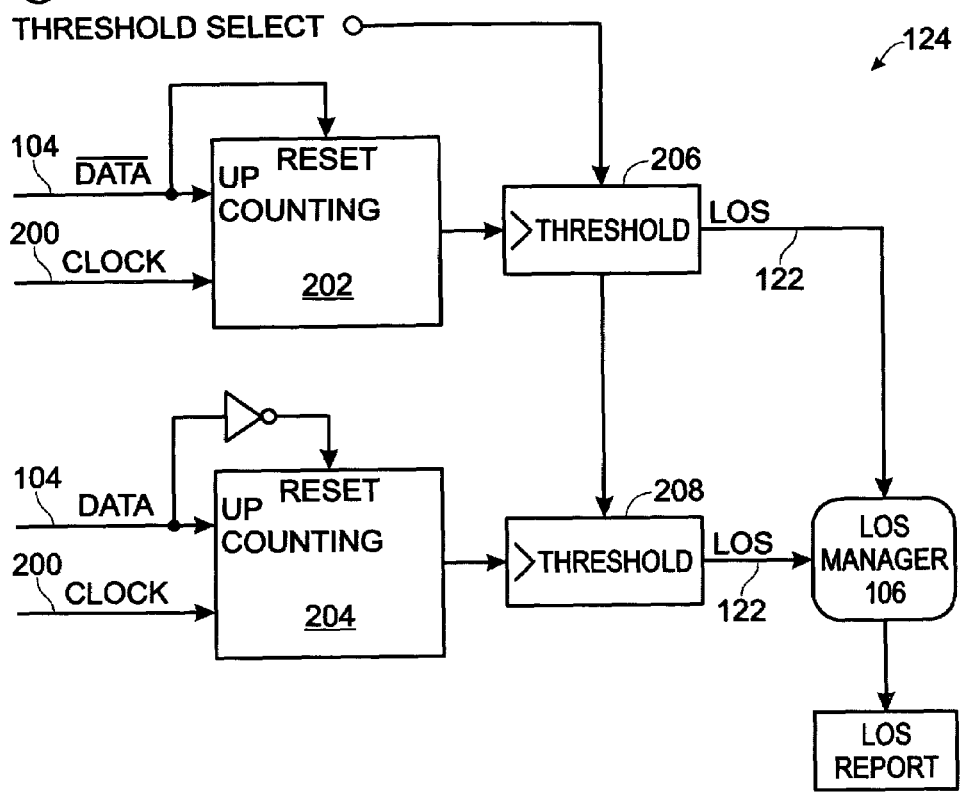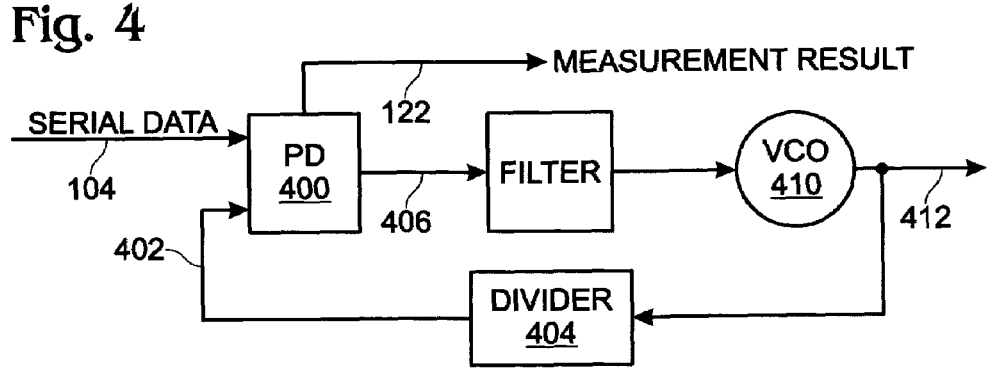

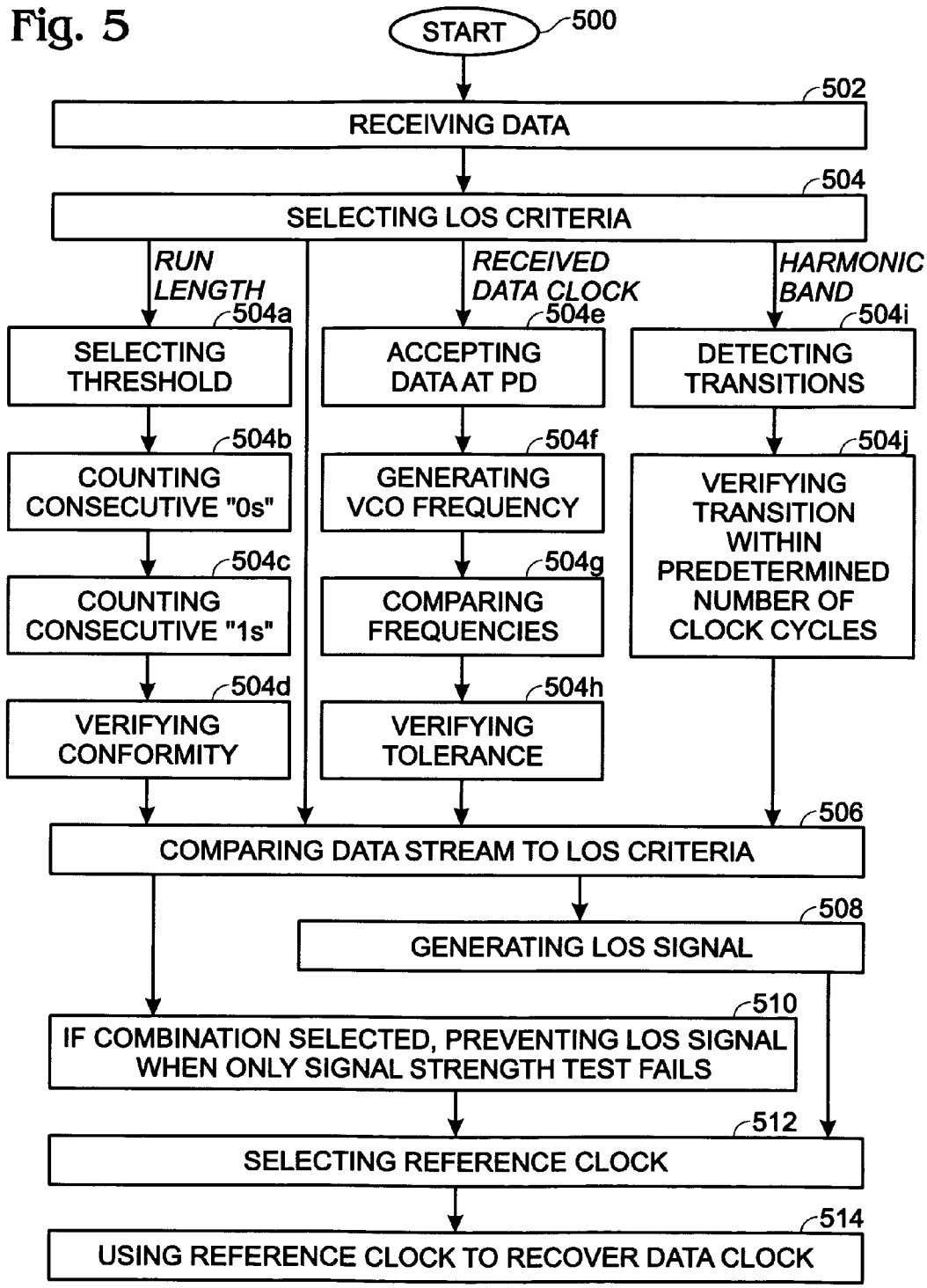

SELECTABLE LOSS OF SIGNAL (LOS) CRITERIA

BACKGROUND OF THE INVENTION

1. Field of the Invention

This invention generally relates to digital communications and, more particularly, to a system and method for selecting loss of signal (LOS) criteria in a serial stream communications receiver.

2. Description of the Related Art

As noted in U.S. Pat. No. 6,999,480, Subrahmanyan et al., a synchronous communications network digital payload data is carried on a particular clock frequency within a synchronous message format. This payload data may include both asynchronous digital data and synchronous digital data originating at a different data rate in a foreign digital network. The Synchronous Optical Network (SONET) and its European counterpart the Synchronous Digital Hierarchy (SDH) provide a standard format of transporting digital signals having various data rates, such as a DS-0, DS-1, DS-1C, DS-2, or a DS-3 signal and their European counterparts within a Synchronous Payload Envelope (SPE), or a container that is a part of a SONET/SDH STS-N/STM-N message frame. In addition to the digital data that is mapped and framed within the SPE or container, the STS-N/STM-N message frame also includes overhead data that provides for coordination between various network elements.

One of the benefits of SONET is that it can carry large payloads (above 50 Mb/s). However, the existing slower speed digital hierarchy can be accommodated as well, thus protecting investments in current equipment. To achieve this capacity, the STS Synchronous Payload Envelope (SPE) can be sub-divided into smaller components or structures, known as Virtual Tributaries (VT) for the purpose of transporting and switching payloads smaller than the STS-1 rate. All services below the DS3 and E-3 rates are transported in the VT structure.

If the digital data that is mapped and framed in the STS-N/STM-N message was originally carried by a clock signal having a different frequency than the SONET/SDH line rate clock, certain adjustments to the framed digital data must be made. For example, if a DS-3 data signal, which is carried by a 44.736 MHz DS-3 clock signal is to be carried in a SONET/SDH fiber-optic network, the DS-3 signal is mapped into the higher rate SPE of an STS-1 message, and extra bytes must be added to the DS-3 signal prior to transmission through the SONET/SDH network. These extra bits are commonly referred to as stuff bits or gap bits and are merely place markers and in general carry no valid data. These gap bits are required because the DS-3 signal is slower than the SONET/SDH clock frequency so that there are not enough DS-3 bits at the higher frequency to form a complete SONET frame. More detail may be found in the Bellcore specification "SONET Transport Systems: Common Generic Criteria", GR-253-CORE, Issue 3, September 2000, the Bellcore specification "Transport Systems Generic Requirements (TSGR): Common Requirements", GR-499-CORE, Issue 2, December 1998, and the ITU-T Recommendation G.783, "Characteristic Synchronous Digital Hierarchy (SDH) Equipment Functional Blocks", January 1994.

When the STS-1 message is received at a network exit node, the overhead bytes are removed from the SONET STS-1 message and replaced by gaps in the data stream. The payload data that remains is de-framed and de-mapped into a data stream carried by a higher clock frequency than the nominal original clock frequency of the payload data. Once the data has been de-mapped and de-framed from the SPE, a phase locked loop (PLL) is typically used to recover the clock information and to adjust the read signal associated with the data stored in an elastic store for transmission downstream as a data signal carried by a smooth clock signal.

As is known, the PLL used to recover the smooth clock signal and smooth data signal is able to smooth out some phase jumps caused by pointer adjustments or asynchronous stuff bits. A PLL is most effective at filtering out high frequency jitter components, i.e., those with a frequency greater than 10 Hz., but is less effective at filtering out the low frequency wander components. Since, typically the wander components are much less than 10 Hz. these wander components are well within the bandwidth of the PLL and are passed without being attenuated. To construct a PLL with a small enough bandwidth to filter the wander components of the phase jumps, large time constants in the PLL control loops would require large component values for the resistors and capacitors used in the PLL. In addition, the large time constants required would result in a PLL that is slow to lock onto the reference signal and would cause long delays in recovering lock after a transient event.

During the transmission of a SONET/SDH message, an error may occur resulting in a loss of data. This loss of data may be caused by a loss of (data) signal (LOS), a loss of the clock signal, a loss of frame, or another error condition may occur. These errors may occur to one or more, or all, of the transported digital signals that have been multiplexed into the SONET/SDH message. In some of these error conditions, an Alarm Indicator Signal (AIS) is generated and certain predetermined bits in the overhead bytes are set. In addition, a predetermined characteristic data signal is provided, by the receiver, in the SONET message payload in lieu of the error data generated by the various pieces of equipment in the absence of a legitimate signal. If the loss of signal were to the entire SONET/SDH message, caused for example by a severed optical fiber, then the predetermined characteristic data signal would be used in lieu of the entire message payload. Typically, the characteristic error data signal is a sequence composed entirely of ones, i.e., "1, 1, 1, 1, 1 . . . ."

The predetermined characteristic data signal is provided at an error condition data rate that is within the SONET/SDH specification. However, it is unlikely that the error condition data rate is equivalent to the payload data rate prior to the loss of signal (LOS) condition occurring. As discussed above, when a PLL that has previously phase locked to an input signal receives the input signal at a new data rate, the PLL must reestablish phase lock at the new input data rate before the output data will be valid. Accordingly, because the characteristic error data signal is at a different data rate than the payload data, the PLL may lose phase lock and have to reacquire phase lock before the output data will be valid. Similarly, when the payload data is restored, the PLL may once again lose phase lock on the characteristic error data rate when the payload data is restored. The time it takes the PLL to reacquire phase lock will result in erroneous data being sent, and a loss of data after restoration of the payload data. Although the problems associated with a loss of signal have been described in the context of SONET communications, it should be understood that similar issues exist with other communication protocols.

It would be advantageous if a receiver could minimize the number of incorrect LOS alarm indicators, to reduce unnecessary loss of PLL locking and the transmission of errored data signals during data clock acquisition.

It would be advantageous if LOS triggers could be selected by the user, to better accommodate local conditions and requirements.

It would be advantageous if a LOS signal was generated only in response to a combination of conditions, to prevent false alarms.

It would be advantageous if multi-rate or continuous rate receivers could optionally select harmonic detector criteria for triggering a LOS signal.

SUMMARY OF THE INVENTION

Accordingly, a method is provided for selecting loss of signal (LOS) criteria in a serial communications receiver. The method receives a serial stream of digital data and selects LOS criteria. The serial stream of digital data is compared to the selected LOS criteria. In response to the serial stream of digital data failing to meet the selected LOS criteria, a LOS signal is generated. Some examples of the LOS criteria that might be selected include a "signal detect" signal received from the source transmitting the serial stream of digital data, a run length test, a signal strength (voltage amplitude) test, harmonic band detection test, and a received data clock test.

In one aspect, selecting LOS criteria includes selecting combinations of the above-mentioned LOS criteria, so that the LOS signal is generated in response to failing to meet the combination of selected LOS criteria. Thus, if a signal strength test is selected (as is conventional) in combination with other tests, a false lock state is prevented in situations where only the signal strength test is failed. In another aspect, a reference clock is selected in response to the serial stream of digital data failing to meet the selected LOS criteria, and the reference clock is used to recover the serial stream data clock.

Additional details of the above-described method, and a serial communications receiver with programmable LOS criteria, are provided below.

BRIEF DESCRIPTION OF THE DRAWINGS

FIG. 2 is a schematic block diagram of the run length test circuit of FIG. 1 in greater detail.

FIG. 4 is a schematic block diagram of the received data clock test circuit of FIG. 1 in greater detail.

FIG. 5 is a flowchart illustrating a method for selecting LOS criteria in a serial communications receiver.

DETAILED DESCRIPTION

Figure 1:
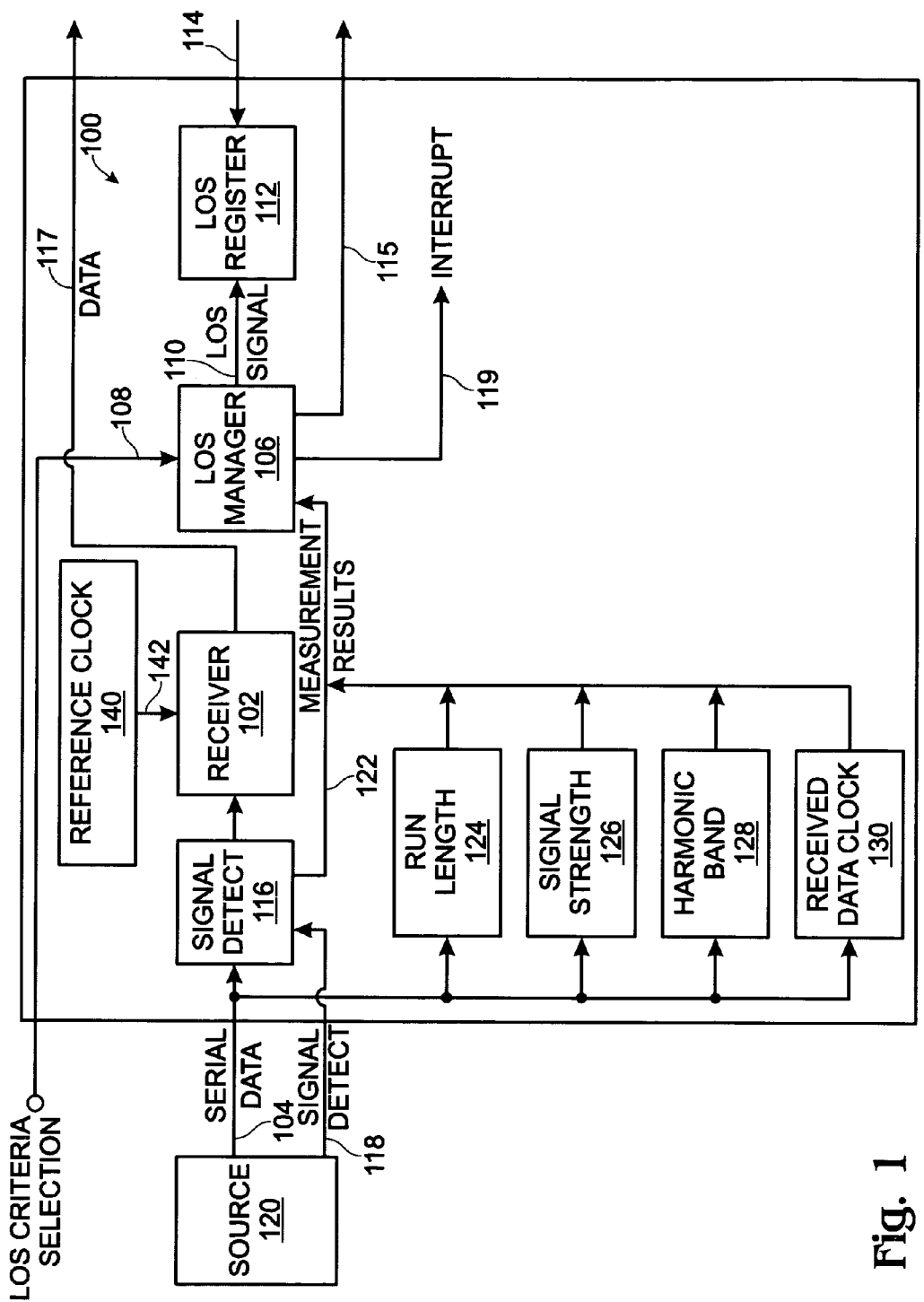
FIG. 1 is a schematic block diagram of a serial communications system with programmable loss of signal (LOS) criteria.

FIG. 1 is a schematic block diagram of a serial communications system with programmable loss of signal (LOS) criteria. The system 100 comprises a receiver 102 having a serial port interface on line 104 to receive a serial stream of digital data. The purpose of the receiver 102 is to deserialize the incoming data by recovering the clock and data. Typically, the data is passed in parallel form to a subsequent stage (not shown). For example, the receiver 102 may accept SONET, Gigabit Ethernet (GBE), Fibre Channel (FC), D1 Video, DTV, DV6000-1, HDTV, ESCON/FICON, digitally wrapped data, video, or FDDI. These formats are either known to use LOS signaling, or to be adaptable for optionally including some form of LOS signaling. An LOS manager 106 has an interface on line 108 to receive a LOS criteria selection signal. The LOS manager 106 selects LOS criteria and, in response to the serial stream of digital data failing to meet the selected LOS criteria, generates a LOS signal at an interface on line 110. As shown, the LOS signal (alarm) is stored in register 112, where it may be transmitted to a communication partner (not shown) on line 114. Alternately, the LOS signal may be accessed from a communications partner via communications on line 114. The LOS signal can also be generated on a pin connected to line 115, the LOS signal can be realized as a particular data pattern (e.g., all "0" bits) in the data generated on line 117, or it can be represented as an interrupt on line 119.

A number of LOS measurement circuits may be employed. For example, the LOS measurement circuits may include a signal detect circuit 116 having an interface on line 118 to receive a "signal detect" signal from the source 120 transmitting the serial stream of digital data on line 104, and an interface on line 122 to supply measurement results. For example, the signal detect circuit 116 may receive a LOS signal being transmitted by source 120. Other LOS measurement circuits include a run length test circuit 124, a signal strength (voltage amplitude) test circuit 126, a harmonic band detection test circuit 128, and a received data clock test circuit 130. Each LOS measurement circuit has an interface on line 122 to supply measurement results. Although test circuits 124, 126, 128, and 130 are shown directly connected to input interface 104, it should be understood that the serial input data may undergo steps of decoding and processing before it is supplied to the test circuits. The LOS manager 106 has an interface on line 122 to receive measurement results from the selected LOS measurement circuit.

FIG. 2 is a schematic block diagram of the run length test circuit 124 of FIG. 1 in greater detail. The run length test circuit 124 has an interface on line 104 to accept the serial stream of digital data, and the data clock is received on line 200. The run length test circuit 124 counts the number of consecutive "0" bits received in the serial data stream using counter 202. Counter 204 counts the number of consecutive "1" bits received in the serial data stream. The run length test circuit 124 verifies that the number of consecutive bits (either "1"s or "0"s) conforms to a predetermined run length threshold, using elements 206 and 208. For example, the threshold may be 5 consecutive bits. In one aspect, the run length test circuit 124 has an interface on line 132 for selecting the run length threshold. The threshold may be varied based upon assumptions concerning received pseudorandom data patterns, for example.

Figure 3:
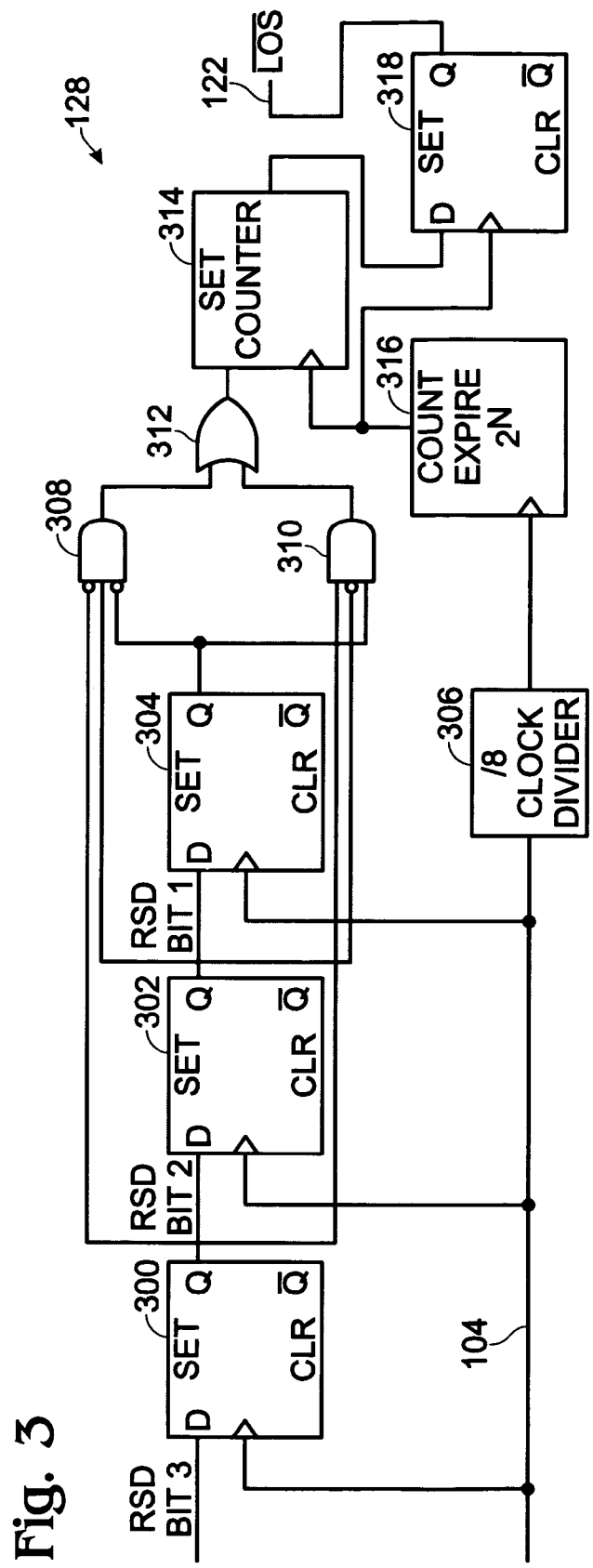
FIG. 3 is a schematic block diagram of the harmonic band detection test circuit of FIG. 1 in greater detail.

FIG. 3 is a schematic block diagram of the harmonic band detection test circuit 128 of FIG. 1 in greater detail. The harmonic band detection test circuit 128 has an interface on line 104 to accept the serial digital date stream. The circuit detects "101" and "010" transitions, and verifies that the transitions occur within a predetermined number of consecutive clock cycles. Alternately stated, the circuit 128 raises an alarm when the circuit does not detect a "101" transition or "010" transition in the data stream, within n number of consecutive clock cycle, where n=2^(Harmonic Band Detector Counter Length). For example, the maximum value of n may equal 16. Thus, it should be understood that the harmonic band test occurs in the time domain, as opposed to the frequency domain. A specific coding scheme compares the transmission bit from one to zero, or from zero to one. The circuit determines the pulse width of the signal (bit combinations), and indirectly calculates the harmonic.

FIG. 4 is a schematic block diagram of the received data clock test circuit 130 of FIG. 1 in greater detail. The received data clock test circuit 130 may include a phase detector (PD) 400 having interfaces to accept the serial stream of digital data on line 104, and voltage controlled oscillator (VCO) frequency on line 402. As shown, the VCO frequency is divided by divider 404. The PD 400 supplies a comparison of the serial stream data clock rate with the VCO frequency at an output on line 406, where the PD 400 measures either phase and frequency differences. The PD output is shown filtered by filter 408. A VCO 410 has an input on line 412 to accept the PD output and an output to supply the VCO frequency on line 414. The received data clock test circuit 130 verifies that the measurement is within a predetermined tolerance. The received data clock test circuit 130 may supply an error measurement result, for example, if the VCO frequency differs from a predetermined value, or if the rate of change in the VCO exceeds a predetermined threshold. Here, the PD is shown as supplying the measurement results on line 122, however, other circuitry (not shown) could be employed to make measurements.

Returning to FIG. 1, although details of the signal strength test circuit 126 have not been shown, it should be understood that this circuits compares the input voltage levels of the serial digital data stream to a predetermined minimum voltage threshold. The threshold may, for example, be a peak-to-peak value, or a level defined with respect to the average voltage or ground. Such a circuit is widely known in the art, and is often used as a LOS trigger. In fact, all of the above-mentioned measurement circuits would be understood to a person of skill in the art. One advantage provided with the present invention system is the ability to select the criteria used to trigger the LOS alarm.

In one aspect, the LOS manager 106 may select a combination of LOS criteria. Then, in response to the serial stream of digital data failing to meet the combination of selected LOS criteria, the LOS manager 106 generates a LOS signal at an interface on line 110. This feature may be used to prevent a false lock LOS scenario. For example, it is conventional that a signal strength test is used to determine LOS. If the LOS manager 106 selects a combination of LOS criteria, which includes the signal strength test, a LOS signal is not generated if only the signal strength test is failed. That is, other tests, in addition to the signal strength test, must be failed in order to generate the LOS signal. This result may be desirable if the serial data can be decoded by the receiver, even though the signal amplitude is below specified limits.

In a different aspect, the LOS manager 106 selects a subset of LOS criteria from a set of LOS criteria. For example, if the system includes 5 different LOS measurement test circuits, the LOS manager may select 3 out of the 5 tests. Then, in response to the serial stream of digital data failing to meet any of the subset of selected LOS criteria (e.g., any of the subset of 3), the LOS signal is generated.

Typically, the system 100 also comprises a reference clock 140 having an output on line 142 to supply a reference clock frequency. The reference clock frequency is usually set to the nominal system frequency, or the data clock rate (or multiple of the data clock rate) at which the serial data stream is anticipated. The use of the reference clock aids in the acquisition of the serial digital data stream. Conventionally, the system is self-clocking, which means that the data clock is recovered from the serial digital data stream. Once the receiver 102 recovers the data clock, the reference clock is no longer necessary. However, in this aspect of the system, the LOS manager 106 selects the reference clock 140 in response to the serial stream of digital data failing to meet the selected LOS criteria. Then, the receiver 102 uses the reference clock frequency to recover the serial stream data clock.

Note, although the system has been depicted as hardware elements, in some aspects the elements may be enabled completely, or in part, as a routine of microprocessor instructions, which are stored in a memory (not shown) and operated on using a microprocessor (nor shown).

Functional Description

FIG. 5 is a flowchart illustrating a method for selecting LOS criteria in a serial communications receiver. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 500.

Step 502 receives a serial stream of digital data. Step 504 selects LOS criteria. Some examples of LOS criteria that may be selected include a "signal detect" signal received from the source transmitting the serial stream of digital data, a run length test, a signal strength (voltage amplitude) test, harmonic band detection test, and a received data clock test. However, it should be understood that other (unnamed) tests may be used to trigger an LOS alarm. Step 506 compares the serial stream of digital data to the selected LOS criteria, and Step 508 generates a LOS signal in response to the serial stream of digital data failing to meet the selected LOS criteria.

If the run length test is selected in Step 504, then the following substeps may be used. Step 504b counts the number of consecutive "0" bits received in the serial data stream. Step 504c counts the number of consecutive "1" bits received in the serial data stream, and Step 504d verifies that the number of consecutive bits conforms to a predetermined run length threshold. In one aspect, Step 504a selects the run length threshold.

If the received data clock test is selected in Step 504, then the following substeps may be used. Step 504e accepts the serial stream of data at a phase detector. Step 504f generates a VCO frequency in response to recovering a serial stream data clock rate. Step 504g compares a measurement of the serial stream data clock rate with the VCO frequency, where the measurement may be either phase or frequency. Step 504h verifies that the measurement is within a predetermined tolerance. In some aspects, the tolerance may be selected.

If the harmonic band detection test is selected in Step 504, then the following substeps may be used. Step 504i detects transitions in the serial digital data stream. The transitions detected are "101" and "010". Step 504j verifies that the transitions occur within a predetermined number of consecutive clock cycles. In some aspects, the number of clock cycles may be selected.

In a different aspect of the method, selecting LOS criteria in Step 504 includes selecting combinations of LOS criteria. As mentioned above, some examples of potential criteria include a "signal detect" signal received from the source transmitting the serial stream of digital data, a run length test, a signal strength (voltage amplitude) test, a harmonic band detection test, and a received data clock test. Then, Step 508 generates the LOS signal in response to failing to meet the combination of selected LOS criteria.

Alternately stated, the LOS signal is not generated if only one of the selected criteria is failed. For example, if the combination of LOS criteria includes the signal strength test as one of the LOS criteria, then Step 510 prevents a false lock state when only the signal strength test is failed.

In another aspect of the method, Step 512 selects a reference clock in response to the serial stream of digital data failing to meet the selected LOS criteria (Step 508). Then, Step 514 uses the reference clock to recover the serial stream data clock.

In another aspect, selecting LOS criteria in Step 504 includes selecting a subset of LOS criteria from a set of LOS criteria, and generating the LOS signal in Step 508 includes generating the LOS signal in response to failing to meet any of the selected subset of LOS criteria. Alternately stated, the LOS measurement criteria are maskable. The use of a mask prevents specifically selected LOS events from triggering the LOS signal, or interrupting higher level functions.

Figure 6:
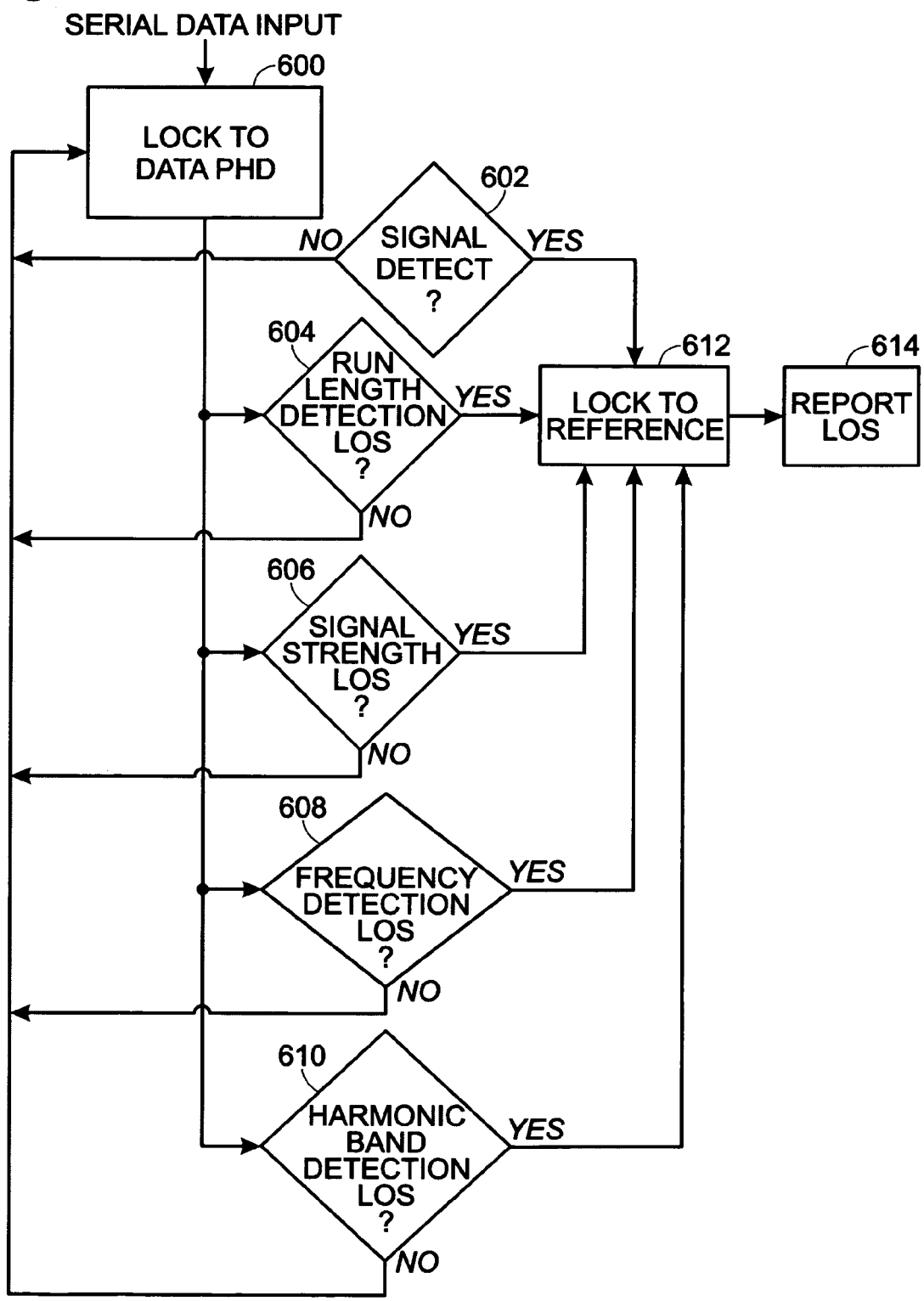
FIG. 6 is a flowchart depicting an alternate representation of a method for selecting LOS criteria.

FIG. 6 is a flowchart depicting an alternate representation of a method for selecting LOS criteria. Once the incoming data clock is recovered and data is processed in Step 600, the system engages in multiple parallel tests. Although 5 tests are shown, the system and method are not limited to any particular number. Step 602 checks for a received signal detect (failure) signal. Note, this failure can be detected prior to proceeding to block 600. Step 604 tests the run length, Step 606 tests the signal strength (note Step 606 may also be performed before Step 600). Step 608 tests the frequency (phase) of the recovered clock, and Step 610 tests the harmonic band. If any of these tests fails, a LOS condition is noted (Step 612) and reported in Step 614. In some aspects, some of the above-mentioned tests may be masked. In other aspects, the LOS is only reported if a combination of tests is failed.

A system and method have been provided for selecting LOS criteria in a serial communications receiver. Some examples of specific LOS criteria and measurement tests have been provided to illustrate the invention. However, the invention is not limited to merely these examples. Other variations and embodiments of the invention will occur to those skilled in the art.

We claim:

1. In a serial communications receiver, a method for selecting loss of signal (LOS) criteria, the method comprising:
   a receiver receiving a serial stream of digital data;
   a LOS manager selecting LOS criteria from a group consisting of a "signal detect" signal received from a source transmitting the serial stream of digital data, a run length test, a signal strength (voltage amplitude) test, harmonic band detection test, and a received data clock test;
   a LOS measurement circuit comparing the serial stream of digital data to the selected LOS criteria;
   in response to the serial stream of digital data failing to meet the selected LOS criteria, the LOS manager generating a LOS signal; and,
   wherein selecting the received data clock test includes:
      accepting the serial stream of data at a phase detector;
      generating a voltage controlled oscillator (VCO) frequency in response to recovering a serial stream data clock rate;
      comparing a measurement of a serial stream data clock rate with the VCO frequency, where the measurement is selected from a group consisting of phase and frequency; and,
      verifying that the measurement is within a predetermined tolerance.

2. The method of claim 1 wherein selecting a run length test includes:
   counting the number of consecutive "0" bits received in the serial data stream;
   counting the number of consecutive "1" bits received in the serial data stream; and,
   verifying that the number of consecutive bits conforms to a predetermined run length threshold.

3. The method of claim 1 wherein selecting the harmonic band detection test includes:
   detecting transitions in the serial digital data stream selected from a group consisting of "101" and "010"; and,
   verifying that the selected transition occur within a predetermined number of consecutive clock cycles.

4. The method of claim 1 wherein selecting LOS criteria includes selecting a subset of LOS criteria from a set of LOS criteria; and,
   wherein generating the LOS signal includes generating the LOS signal in response to failing to meet any of the selected subset of LOS criteria.

5. The method of claim 1 wherein selecting LOS criteria includes selecting combinations of LOS criteria from the group including the "signal detect" signal received from the source transmitting the serial stream of digital data, the run length test, the signal strength (voltage amplitude) test, the harmonic band detection test, and the received data clock test; and,
   wherein generating the LOS signal includes generating the LOS signal in response to failing to meet the combination of selected LOS criteria.

6. The method of claim 5 wherein selecting the combination of LOS criteria includes selecting the signal strength test as one of the LOS criteria; and,
   the method further comprising:
   in response to selecting a combination of LOS criteria, the LOS manager preventing a false lock state when only the signal strength test is failed.

7. The method of claim 1 further comprising:
   in response to the serial stream of digital data failing to meet the selected LOS criteria, the LOS manager selecting a reference clock; and,
   the receiver using the reference clock to recover the serial stream data clock.

8. A serial communications system with programmable loss of signal (LOS) criteria, the system comprising:
   a receiver having a serial port interface to receive a serial stream of digital data;
   an LOS manager having an interface to receive an LOS criteria selection signal and an interface to receive measurement results from a selected LOS measurement circuit, the LOS manager selecting LOS criteria and, in response to the serial stream of digital data failing to meet the selected LOS criteria, generating a LOS signal at an interface;
   a LOS measurement circuit having an interface to supply measurement results, the LOS measurement circuit being selected from a group consisting of a signal detect circuit having an interface to receive a "signal detect" signal from a source transmitting the serial stream of digital data, a run length test circuit, a signal strength (voltage amplitude) test circuit, a harmonic band detection test circuit, and a received data clock test circuit;
   wherein the received data clock test circuit comprises:
      a phase detector (PD) having interfaces to accept the serial stream of digital data and voltage controlled oscillator (VCO) frequency, the PD supplying a comparison of a serial stream data clock rate with the VCO frequency at an output, where the measurement is selected from a group consisting of phase and frequency;
      a VCO having an input to accent the PD output and an output to supply the VCO frequency; and,
      wherein the received data clock test circuit verifies that the measurement is within a predetermined tolerance.

9. The system of claim 8 wherein the run length test circuit has an interface to accept the serial stream of digital data, the run length test circuit counting the number of consecutive "0" bits received in the serial data stream, counting the number of consecutive "1" bits received in the serial data stream, and verifying that the number of consecutive bits conforms to a predetermined run length threshold.

10. The system of claim 8 wherein the harmonic band detection test circuit has an interface to accept the serial digital date stream, the harmonic band detection test circuit detecting transitions selected from a group consisting of "101" and "010", and verifying that the selected transition occurs within a predetermined number of consecutive clock cycles.

11. The system of claim 8 wherein the LOS manager selects a subset of LOS criteria from a set of LOS criteria and, in response to the serial stream of digital data failing to meet any of the subset of selected LOS criteria, generates a LOS signal at an interface.

12. The system of claim 8 wherein the LOS manager selects a combination of LOS criteria and, in response to the serial stream of digital data failing to meet the combination of selected LOS criteria, generates a LOS signal at an interface.

13. The system of claim 12 further comprising:
a plurality of LOS measurement circuits selected from the group including the signal detect circuit having an interface to receive a "signal detect" signal from the source transmitting the serial stream of digital data, the run length test circuit, the signal strength (voltage amplitude) test circuit, the harmonic band detection test circuit, and the received data clock test circuit.

14. The system of claim 12 wherein the LOS manager selects a combination of LOS criteria including the signal strength test, and fails to generate a LOS signal when only the signal strength test is failed.

15. The system of claim 8 further comprising:
a reference clock having an output to supply a reference clock frequency;
wherein the LOS manager selects the reference clock in response to the serial stream of digital data failing to meet the selected LOS criteria; and,
wherein the receiver uses the reference clock frequency to recover the serial stream data clock.

16. In a serial communications receiver, a method for selecting loss of signal (LOS) criteria, the method comprising:
a receiver receiving a serial stream of digital data;
a LOS manager selecting a received data clock test LOS criteria;
a LOS measurement circuit comparing the serial stream of digital data to the selected LOS criteria;
in response to the serial stream of digital data failing to meet the selected LOS criteria, the LOS manager generating a LOS signal; and,
wherein selecting the received data clock test includes:
accepting the serial stream of data at a phase detector;
generating a voltage controlled oscillator (VCO) frequency in response to recovering a serial stream data clock rate;
comparing a measurement of the serial stream data clock rate with the VCO frequency, where the measurement is selected from a group consisting of phase and frequency; and,
verifying that the measurement is within a predetermined tolerance.

* * * * *